United States Patent Office 3,267,819
Patented August 23, 1966

3,267,819
BRAKE MECHANISM WITH MECHANICAL LOCK
Harry M. Valentine and Frank R. Schubert, Elyria, Ohio, assignors to Bendix-Westinghouse Automotive Air Brake Company, Elyria, Ohio, a corporation of Delaware
Original application July 5, 1961, Ser. No. 121,970, now Patent No. 3,173,726, dated Mar. 16, 1965. Divided and this application May 11, 1964, Ser. No. 366,456
2 Claims. (Cl. 92—24)

This application is a division of our application Ser. No. 121,970 filed July 5, 1961 for Fluid Brake System Including a Mechanical Lock, now Patent No. 3,173,726 dated Mar. 16, 1965.

This invention relates to a brake mechanism for vehicles and more particularly to a safety brake mechanism for vehicles equipped with conventional air brake systems.

One of the principal objects of the present invention is to provide a compressed air safety brake system for vehicles which is so constituted as to automatically and mechanically hold the brakes in applied position in the event that the system pressure drops below a predetermined value.

Another object is to provide in a compressed air braking system, a novel arrangement whereby the brakes may be automatically applied and locked in such position in the event of failure of or serious reduction in pressure of the fluid pressure supply.

Still another object is to provide in a system of the above character, a novel arrangement wherein release of the brakes may not be effected until the system pressure rises to a predetermined value such that it would be safe for the vehicle to proceed.

A further object is to provide a system wherein the brakes may be applied and locked in applied position by a manually operated control, such an arrangement providing an efficient parking brake construction under the direct supervision of the operator.

Still another object is to provide in a safety brake construction of the foregoing type, a novel arrangement whereby the braking effect of the safety brakes may be supplemented by operation of the usual brake valve.

A further object resides in the provision of a novel combined service and emergency brake actuator which may be locked in brake applied position and which includes an efficiently operable construction of relatively few parts so arranged as to occupy a minimum of space.

Other objects and novel features of the invention will appear more fully hereinafter from the following detailed description when taken in connection with the accompanying drawings. It is to be expressly understood, however, that the drawings are utilized for purposes of illustration only and are not to be taken as a definition of the limits of the invention, reference being had for this purpose to the appended claims.

Referring to the drawings wherein similar reference characters refer to similar parts throughout the several views.

Figure 1:
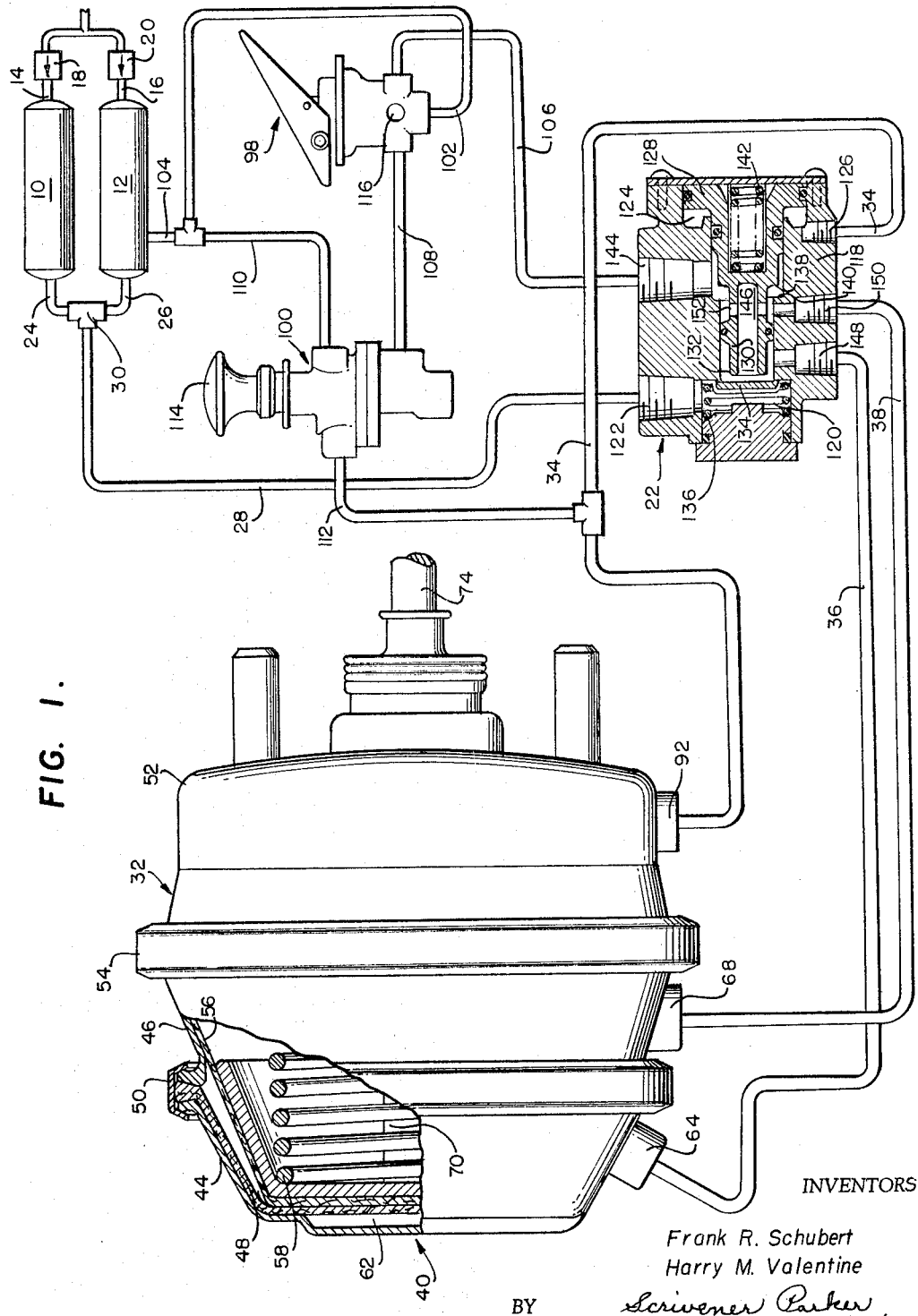
FIG. 1 is a diagrammatic view partly in section of a safety brake system embodying the principles of the present invention.

Referring more particularly to FIG. 1, the safety brake system of the present invention is illustrated therein as including an emergency reservoir 10 and a service reservoir 12 adapted to be supplied with compressed air from a suitable source by way of conduits 14 and 16 having one-way check valves 18 and 20 therein, the reservoirs being connected to a control valve 22 by conduits 24, 26 and 28, a conventional double check valve 30 being included for ensuring a supply of compressed air from one of the reservoirs in the event of failure of the other. By means to be described more fully hereinafter, the control valve 22 is adapted to control the application of fluid pressure to and from a novel emergency and service brake actuator 32 by way of conduits 34, 36 and 38, the construction of the actuator 32 being such that a brake application may be mechanically locked or released under certain conditions in the operation of the system.

Figure 2:
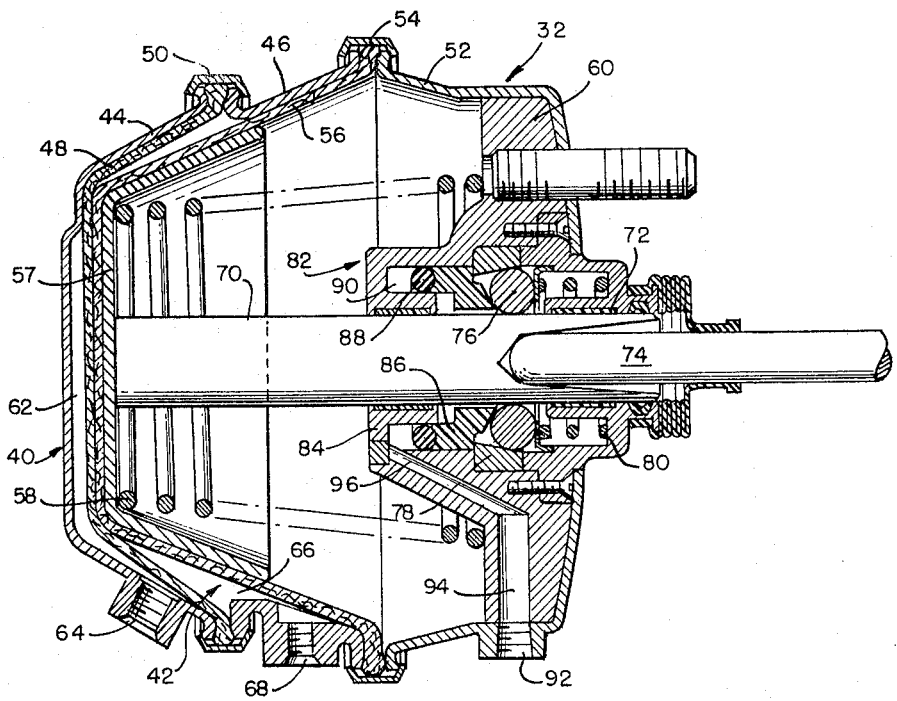
FIG. 2 is an axial sectional view of the novel brake actuator which is preferably used in the system of FIG. 1.
Figure 3:
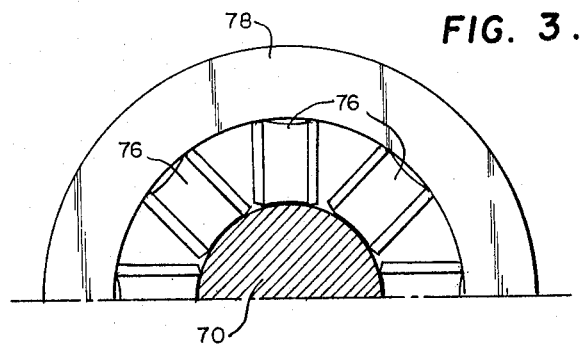
FIG. 3 is an enlarged transverse sectional view of a portion of the actuator of FIG. 2 illustrating the relationship of the brake locking rollers and the brake push rod.

Referring more particularly to FIG. 2, the novel actuator 32 includes an emergency portion 40 and a service portion 42, the former including casing parts 44 and 46 having the peripheral portion of an emergency diaphragm 48 clamped therebetween by a suitable clamp 50. Part 46 is connected with casing part 52 by a clamp 54 with the peripheral portion of a service diaphragm 56 therebetween, a suitable push plate 57 bearing against the diaphragm 56 through the action of a return spring 58 having its opposite end bearing against the end wall 60 of the actuator. It will be seen from FIGS. 1 and 2 that the emergency portion 40 includes an emergency chamber 62 which is connected with the conduit 36 by way of an opening 64 while the service portion 42 includes a service chamber 66 which is connected with the conduit 38 by way of an opening 68. In order to make the actuator 32 as short as possible, the casing parts 44 and 46 are tapered and the diaphragms 48 and 56 are arranged in nesting relationship with the service diaphragm 56 of larger effective area. As shown, a push rod 70 is secured to the push plate 57 and is slideable through a guide 72 carried by the end wall 60, the push rod being provided with a recess for receiving the end of a brake applying rod 74. As well understood by those skilled in the art, the opposite end of the brake rod 74 may be connected with the vehicle brake through a conventional slack adjuster or other type of brake arm.

With the above arrangement it will be understood that when fluid pressure is supplied to the emergency chamber 62, both diaphragms 48 and 56 will be moved to the right to effect a brake application through corresponding movement of the push rod 70 and brake rod 74. Also, in the event that a leak occurs in the diaphragm 48, the brakes will nevertheless be applied by the fluid pressure passing from the chamber 62 to the chamber 66.

The present invention provides a novel arrangement for mechanically and automatically locking the actuator 32 in brake applied position and as shown includes a plurality of locking rollers 76 which are interposed between a cam ring 78 and the push rod 70 and are normally urged into locking position by means of a spring 80. In this position, brake applying movement of the rod 70 to the right may take place. However, any movement of the rod 70 to the left, corresponding to brake releasing movement, is prevented since the locking rollers become firmly wedged between the ring 78 and the rod 70 through the action of the spring 80. Thus, after the brake has been applied, the locking rollers 76 prevent brake releasing movement of the rod 70.

Means are provided for maintaining the locking rollers 76 in released position and preferably such means is controlled by fluid pressure. As shown, a fluid pressure release means 82 includes a cylinder 84 in which a deformable annular piston 86 of suitable plastic material is housed and positioned between an O-ring seal 88 and the rollers 76, the cylinder including a chamber 90 to which fluid pressure from conduit 34 may be conducted by way of opening 92 and ducts 94 and 96 formed in the end wall 60. Thus, when the chamber 90 is charged with fluid under pressure, piston 86 is effective to move the locking rollers 76 to the right against the tension of the spring 80 to relieve the locking effect of the rollers upon the push rod 70 and allow movement of the latter in opposite directions for brake application and release. On the other hand when the chamber 90 is exhausted, the spring 80 is effective to move the rollers 86 into locking position and prevent any left hand movement of the push rod 70 as above described.

A novel arrangement including the control valve 22 is provided for controlling the operation of the actuator 32. As shown, such arrangement comprises a graduating type of manually controlled brake valve 98, of conventional construction and a combined manual and automatic control valve 100 which may be constructed as shown in the copending application of Harry M. Valentine et al. Ser. No. 108,882, filed May 5, 1961, now Patent No. 3,115,161, dated Dec. 24, 1963 and owned by the same assignee. Brake valve 98 is provided with an inlet constantly connected with the service reservoir 12 by way of conduits 102 and 104, and is provided with a pair of outlets, one of which is connected with the control valve 22 by conduit 106 and the other of which is connected with the manual control valve 100 by conduit 108. The manual control valve 100 is provided with an inlet connected to the service reservoir 12 through conduits 110 and 104, and an outlet connected with the conduit 34 by a conduit 112. Valve 100 is provided with a manually operable control handle 114 which may be moved inwardly to connect conduits 110 and 112 and close the left end of conduit 108. Handle 114 may also be manually moved outwardly to interrupt the communication between conduits 110 and 112 and connect conduit 108 with the conduit 112. The valve 100 is also capable of automatically connecting the conduits 112 and 108 when the fluid pressure in the reservoir 12 drops to a predetermined low value of the order of 40 p.s.i. It will be understood that the brake valve 98 is provided with the usual exhaust connection 116 which normally connects the outlet conduits 106 and 108 with the atmosphere when the valve 98 is in the normal release position. Thus when the control valve 114 is manually or automatically moved to the position where conduits 112 and 108 are connected, conduits 112 and 34 will be exhausted through the exhaust opening 116 when the valve 98 occupies the normal position.

Control valve 22 comprises a casing 118 having a cavity 120 at one end thereof connected at all times with the reservoir conduit 28 through inlet port or opening 122, and having a control chamber 124 at the other end thereof connected by way of control port or opening 126 to the control conduit 34. A stepped control piston 128 is mounted within the control chamber 124 and is provided with a hollow plunger 130 having a valve 132 at its free end adapted to contact and open a disk valve 134, the latter being normally urged to the closed position shown in by means of a spring 136. An intermediate portion of the plunger 130 is formed as a valve 138 adapted to close upon a seat 140 when the piston 128 moves to the left. In the position illustrated, fluid pressure in the control chamber 124 is effective to move the control piston to the right against the tension of spring 142 to open valve 138 and connect the conduit 106 with both the conduits 36 and 38 by way of opening 144 and a hollow bore 146 in the plunger 130, the latter communicating with outlet port or opening 148 and port or opening 150 which are respectively connected with the conduits 36 and 38.

With the parts in the position shown in FIGS. 1 and 2, the manual control valve 100 occupies the "in" or release position where fluid pressure from the reservoir 12 is conducted to the conduits 112 and 34 to maintain the control valve 22 in the position illustrated and to charge the lock release means 82 to allow movement of the push rod 70 in opposite directions.

To apply the brakes in service, it is only necessary to operate the brake valve 98 in order to connect the service reservoir 12 with the conduits 106 and 108 through the conduits 102 and 104. Charging of conduit 108 has no effect since the left end thereof is closed at the valve 100. Fluid pressure from conduit 106 however is conducted to both the conduits 36 and 38 by way of opening 144, past open valve 138, to bore 146 and from the latter to opening 148 by way of open valve 132, and to opening 150 through holes 152 in the plunger 130. Charging of conduit 36 will conduct fluid pressure to the emergency chamber 62 while charging of the conduit 38 will conduct fluid pressure to the service chamber 66. Since the emergency diaphragm 48 is thereby subjected to equal pressures on opposite sides, any wear on this diaphragm is greatly minimized. The simultaneous application of equal pressures to the chambers 62 and 66 will result in a service application of the brake through movement of the service diaphragm 56, the push rod 70 and the brake rod 74 to the right. Release of the brake is accomplished by allowing the brake valve 98 to return to its normal inactive position to exhaust the chambers 62 and 66 to atmosphere through the connections heretofore described, and by way of the conduit 106 and the brake valve exhaust 116.

In the event that it is desired to operate the actuator 32 as a parking brake it is only necessary for the operator to manually move the handle 114 of the valve 100 to its "out" or parking position to shut off the conduit 110 and connect conduits 112 and 108. Since the latter conduit is connected with the exhaust opening 116 of the brake valve 98 it will be understood that conduits 112 and 34 will also be exhausted. Exhausting of conduit 34 will exhaust the lock release means 82 so that the locking rollers will prevent movement of the push rod 70 to the left while permitting movement thereof to the right. Exhausting of the control chamber 124 of the control valve 22 will enable movement of the piston 128 toward the left to close valves 132 and 138 and open valve 134. Opening of the latter valve will serve to charge the emergency chamber 62 of the actuator 32 by way of emergency reservoir 10, conduit 28, opening 122, chamber 120, opening 148 and conduit 36 in order to effect a brake application through movement of the diaphragms 48 and 56 in unison, along with the brake operating parts associated therewith. It will be understood that such parking brake application will be maintained in a locked condition by the action of the locking rollers 76 even though the pressure of the supply reservoir may later be reduced to zero through leakage or other failure.

It will be understood that in the event the supply pressure available in reservoir 12 drops to a value of the order of 40 p.s.i., the valve 100 will automatically operate in the same manner as if the operator had moved the handle 114 outwardly to the above described parking position. Under these conditions precisely the same brake application as above described would occur, which application would be locked in the applied position.

In the event that a service brake application is made while the valve 100 is in the above described parking or emergency position, with the handle 114 in its "out" position, fluid pressure will be delivered to the lock releasing means 82 through conduit 108, manual control valve 100, conduit 112 and conduit 34. Fluid pressure will also be conducted through the conduit 106 to the opening 144 of the control valve 22. Flow of such pressure through the control valve will at first be prevented by the closed valve 138. However, as soon as the pressure within the control chamber 124 due to the charging of conduit 34 has attained a value such that piston 128 moves the valve 138 to open position, fluid pressure will be conducted to the service chamber 66 by way of bore 146, opening 150 and conduit 38. In this manner, a service application of the brake chamber 32 may be made which will override the emergency or parking application.

When the above described service application is released by allowing the brake valve 98 to return to the normal release position, some compressed air may be trapped within the service chamber 66 as the valve 138 is moved to its closed position. Such trapped air will have the effect of increasing the emergency application by an amount equal to the difference in areas of the service and emergency diaphragms multiplied by the pressure trapped between them. This trapped pressure may be minimized by including a choke of conventional design in the opening 126 in order to retard the release of fluid pressure from the chamber 124.

In order to release the parking brakes, the handle 114 of the manual control valve 100 is moved to the "in" or release position in order to charge the control chamber 124 and the lock releasing means 82 through conduits 112 and 34. As soon as the control valve 22 returns to the position shown, the emergency chamber 62 will be exhausted by way of conduit 36, opening 148, open valve 132, bore 146, opening 152, opening 144, conduit 106 and the brake valve exhaust 116, the opening 144 of the control valve 22 thus serving as an exhaust port. Even though the cylinder 90 of the lock releasing means 82 is charged with fluid pressure through the conduit 34, this action will be insufficient to release the locking rollers 76 from their wedging and locking engagement with the brake cam ring 78 and the push rod 70. Accordingly, the brake rod 74 will remain in its applied and locked position. This locked condition may be overcome by effecting a heavy service application of the actuator 32 sufficient to move the push rod 70 forwardly slightly in order to assist the piston 86 in unlocking the rollers 76. This action is accomplished by merely operating the brake valve 98 to charge the emergency and service chambers 62 and 66 a sufficient amount through conduits 36 and 38 as heretofore described.

In the event that the brake actuator 32 has been automatically applied through a drop in system pressure, the brake application may be unlocked and released in the manner just described, as soon as the fluid pressure has built up to a value in excess of 40 p.s.i.

From the foregoing, it will be readily understood that the present invention provides a highly efficient safety brake mechanism which is automatically applied and mechanically held in applied position in the event that the system pressure drops to a predetermined value such that it would be unsafe to operate the vehicle. The construction is also such that the safety brake may be used for parking purposes by merely manually operating the valve 100 to its park position. In either case, the brakes may be readily unlocked and released by operation of the valve 100 to the release position combined with a heavy service application of the conventional brake valve.

The conical arrangement of the emergency and service portions of the brake actuator materially shortens the over-all length of the actuator, thus enabling installation on vehicles where space for accommodating brake actuators is at a premium. The double diaphragm construction and the system connections also provide a high degree of safety, inasmuch as during a service application, the pressures on opposite sides of the emergency diaphragm are balanced to minimize wear thereof. Also, in the event that the emergency diaphragm fails for any reason, the fluid pressure will be effective upon the service diaphragm to provide efficient braking.

While the invention has been shown and described herein with considerable particularity, it will be understood by those skilled in the art that various modifications may be made therein without departing from the spirit of the invention. Reference will therefore be had to the appended claims for a definition of the limits of the invention.

What is claimed is:

1. A fluid pressure actuator comprising a housing having at least a pair of cup-shaped diaphragms therein, one diaphragm defining a first pressure chamber between one side thereof and one end wall of the housing, and both diaphragms defining a second pressure chamber therebetween, the effective area of said one diaphragm being less than the other diaphragm, resilient means interposed between the other diaphragm and the other end wall of the housing for normally maintaining the central portions of the diaphragms in contacting relationship and with a part of the central portion of said one diaphragm in engagement with said one end wall, a brake rod operatively connected with the other diaphragm and extending through said other end wall, spring-applied brake locking means in said housing for locking said rod against movement toward said one end wall, and a fluid pressure operated member within the housing for releasing said brake locking means.

2. A fluid pressure actuator for operating vehicle brakes and the like, comprising a housing having a first end wall provided with a centrally arranged opening, a brake actuating rod extending freely through said opening and movable axially outwardly from an inner inoperative position, a second end wall having an inlet port for an emergency source of fluid under pressure, first and second cup-shaped diaphragms marginally attached to said housing and movable relative thereto and to each other, the effective area of the first diaphragm being less than the second diaphragm, the first diaphragm defining an emergency pressure chamber between one side thereof and said second end wall, and both diaphragms defining a service pressure chamber between the marginal portions thereof, resilient means interposed between the first end wall and the brake actuating rod for normally maintaining the latter in its inoperative position with the inner end thereof contacting the central portion of the second diaphragm, said resilient means normally maintaining the central portions of the diaphragms in contacting relationship with a portion of the central portion of the first diaphragm in engagement with said second end wall, said housing having a port for admitting fluid under pressure to said service pressure chamber spring-applied locking means mounted in said housing adjacent said first end wall for locking said rod against movement toward said second end wall and a fluid pressure operated device within the housing for releasing said locking means.

References Cited by the Examiner
UNITED STATES PATENTS

| | | | |
|---|---|---|---|
| 1,297,517 | 3/1919 | Turner | 303—6 |
| 2,119,419 | 5/1938 | Clench | 92—28 |
| 2,936,785 | 5/1960 | Hastings | 92—49 |
| 3,064,685 | 11/1962 | Washnock et al. | 92—50 |
| 3,090,359 | 5/1963 | Hoppenstand | 92—64 |

FOREIGN PATENTS 48,261  5/1918  Sweden.

MARK NEWMAN, *Primary Examiner.*

S. LEVINE, *Assistant Examiner.*